DATA COMMUNICATION PROCESSOR

Filed Aug. 13, 1963 13 Sheets-Sheet 1

INVENTORS
DONALD J. BIRMINGHAM
WILLIAM C. HILL
ROBERT A. MAC KENZIE, JR
-AND- BUDDIE J. PINE
BY
ATTORNEY

March 28, 1967 D. J. BIRMINGHAM ETAL 3,311,889
DATA COMMUNICATION PROCESSOR
Filed Aug. 13, 1963 13 Sheets-Sheet 7

1

3,311,889

DATA COMMUNICATION PROCESSOR

Donald J. Birmingham, William C. Hill, Robert A. MacKenzie, Jr., and Buddie J. Pine, Phoenix, Ariz., assignors to General Electric Company, a corporation of New York Filed Aug. 13, 1963, Ser. No. 301,754
14 Claims. (Cl. 340—172.5)

The present invention pertains to data processing equipment, and more specifically to data processing equipment intended for use in connection with common carrier data transmission facilities.

Electronic data processing has rapidly become a necessary adjunct to the everyday business world and provides not not a means for calculating, accounting, and general data processing, but also provides a source of business management information. To incorporate a data processing system into a business frequently requires the transmission of data for entry into the system over long distances. The feeding of data, in binary form, over long distances gives rise to substantial transmission problems before the resulting communications and processing network is feasible. Not the least of these problems is the great disparity between the bit rate transmission of common carrier facilities and the rapidity with which modern data processing systems handle information. It will become obvious, when considering the disparity in speed between the processing system and the communications channels, that a substantial buffering problem exists when tying the two systems into a network. Many solutions to the problem have been posed all of which include expensive arrangements of computer hardware and frequently entail extensive and inefficient software programs.

To further complicate the problem of matching communications channels to a data processing system, a variety of bit rates may be presented by the respective channels as well as a variety of codes utilized to represent information. To accommodate this variety of bit rates and codes, it becomes necessary to manipulate the data flow and further provide computational facilities to enable code conversion techniques to be implemented for translation of communication codes to languages compatible with data processing systems. Prior art systems have provided various responses to these demands of the communications data processing system; however, the solution to the problems provided by these systems entails great expense and unnecessary inefficiency.

Accordingly, it is an object of the present invention to provide a data communication processor for receiving and transmitting information at common carrier rates while operating upon stored information for subsequent transmission.

It is another object of the present invention to provide a data communication processor to receive and transmit information from a plurality of common carrier lines while storing the information received and information to be transmitted.

It is still another object of the present invention to provide a means for controlling data transmission, among several remote terminals having various transmission rates.

It is another object of the present invention to provide a data communication processor for periodically servicing a plurality of common carrier lines while providing data processing facilities.

It is still another object of the present invention to provide a data communication processor for operation and manipulation of data in accordance with a stored program while having the capability of periodically interrupting the program to send and receive information.

2

It is a further object of the present invention to provide a data communication processor having a means for storing incoming bit-serial information prior to its entry into the data communications processor.

It is still another object of the present invention to provide a common carrier bit sampling device for sampling the pulse code of a common carrier code at predetermined times to ascertain the information content of the code and to store that information.

It is another object of the present invention to provide a data communication processor having a unique channel addressing scheme wherein designated words of memory are allocated to each channel and are utilized to store partially received and partially transmitted characters as well as significant control data relating to the respective channels.

It is a further object of the present invention to provide a data communication processor having a counting system for the initiation of an alarm signal to indicate the presence of a dead loop or the existence of a data losing condition of the data processor.

Further objects and advantages of the present invention will become apparent to those skilled in the art as the description thereof proceeds.

Briefly, in accordance with one embodiment of the present invention, a communications data processing system is provided that utilizes a high speed random access memory including a stored program that may be presented to the system through the expediency of a permanent storage means such as paper tape. The program is tailored to fit the particular application involved and may be utilized to implement arithmetic functions on the received or transmitted data. A buffer selector is provided for facilitating communication between respective channels and the corresponding buffers with the communications processor. Similarly, a controller selector is provided to control the communication of information between selected peripheral equipment and the processor. The system is provided with a unique counter system which periodically interrupts the program to return to a different portion of the program pertaining to input/output equipment for servicing the respective channels. The counting feature also provides for an automatic reloading of the program if control is not returned to the program after the input/output equipments have been serviced. Further, to prevent the system from hanging in a loop without going into a program interrupt mode, the counter system is provided with a reset count feature that requires a program interrupt before more than three resets of the counting means are effected. The counter system may also act as an elapsed time clock to provide the necessary clocking desirable in real time systems such as the communications data processing system of the present invention.

The buffering of the respective channels to the remainder of the system is implemented with a unique bit buffering system that enables the bit serial information being received from the respective channels to be stored one bit at a time rather than requiring the storage of an entire character or word. The saving in hardware from the bit buffering system is substantial without detracting from the operational features of the processing system. In combination with the bit buffering system and the counting system, the data communication processing system of the present invention implements a unique scanning system whereby three scanning words are stored in memory for each channel communicating with the system. Upon reaching the routine for addressing the respective channels, the three scan words per channel are retrieved from memory and information is sent or received in accordance with the control portion of the respective scan words.

The present invention may be more readily described by reference to the accompanying figures in which.

Figure 5:
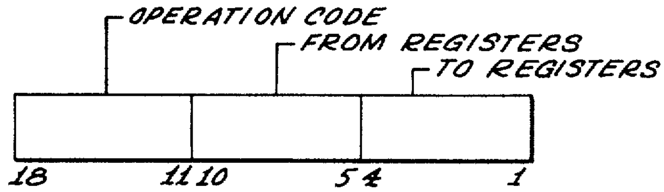
Figure 6:
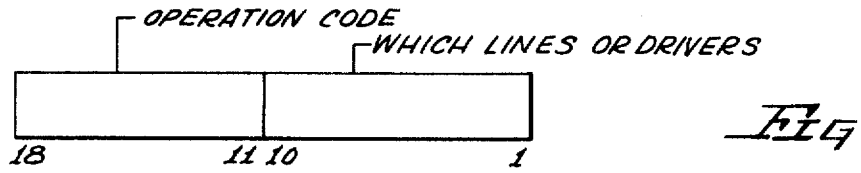
Figure 7:
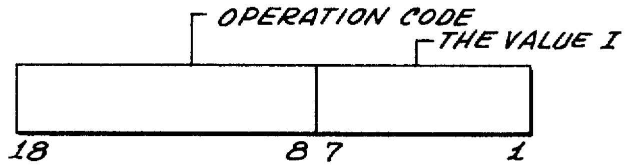

FIGURES 5, 6, and 7 are diagrams showing three formats utilized for general instructions and indicating the respective fields thereof.

Figure 8:
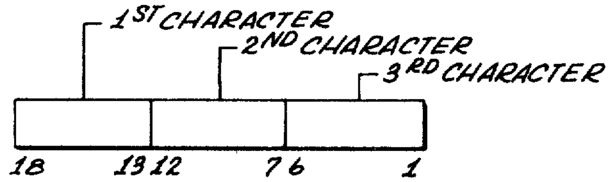

FIGURE 8 is a diagram of an alphanumeric data word using three data fields.

Figure 9:
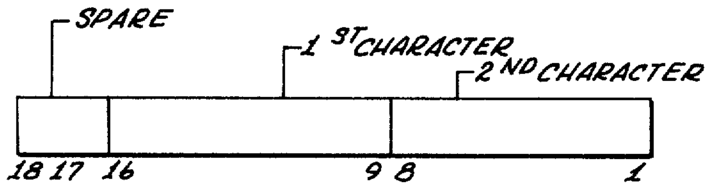

FIGURE 9 is a diagram of an alternate alphanumeric data word format useful when the common carrier characters are eight level "Teletype" characters.

Figure 10:
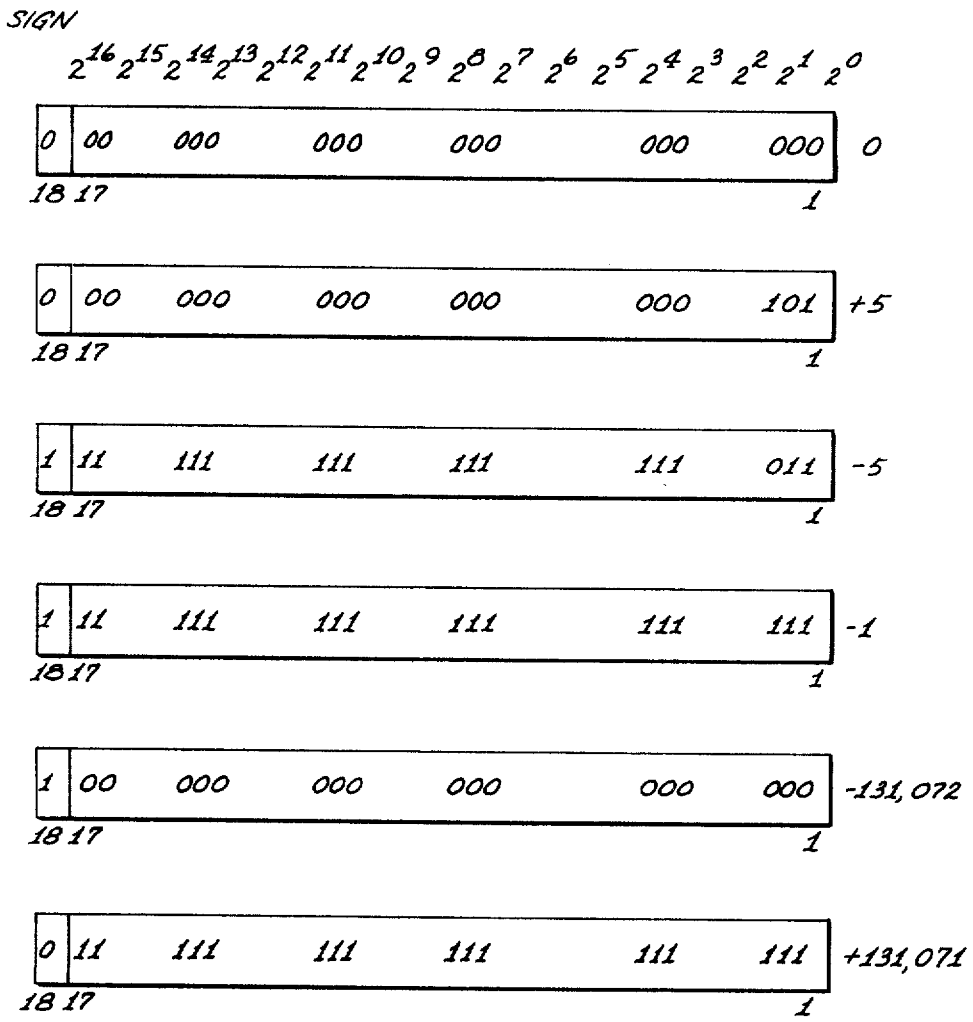

FIGURE 10 illustrates six possible bit configurations of the eighteen bit word utilized in the system of the present invention.

Figure 3:
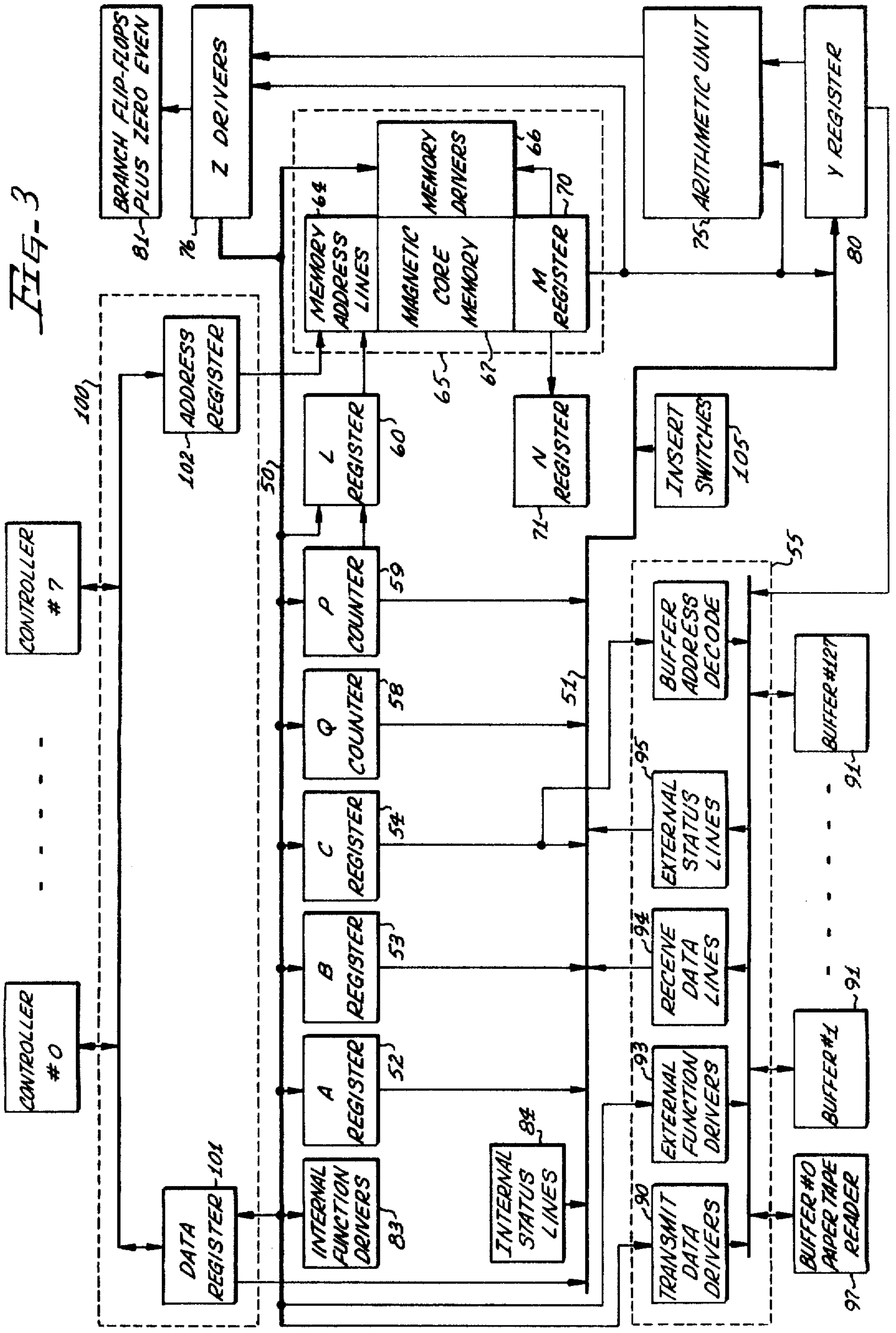
FIGURE 3 is an expansion of the block diagram of FIGURES 1 and 2 showing information flow in the system of the present invention.
Figure 11:
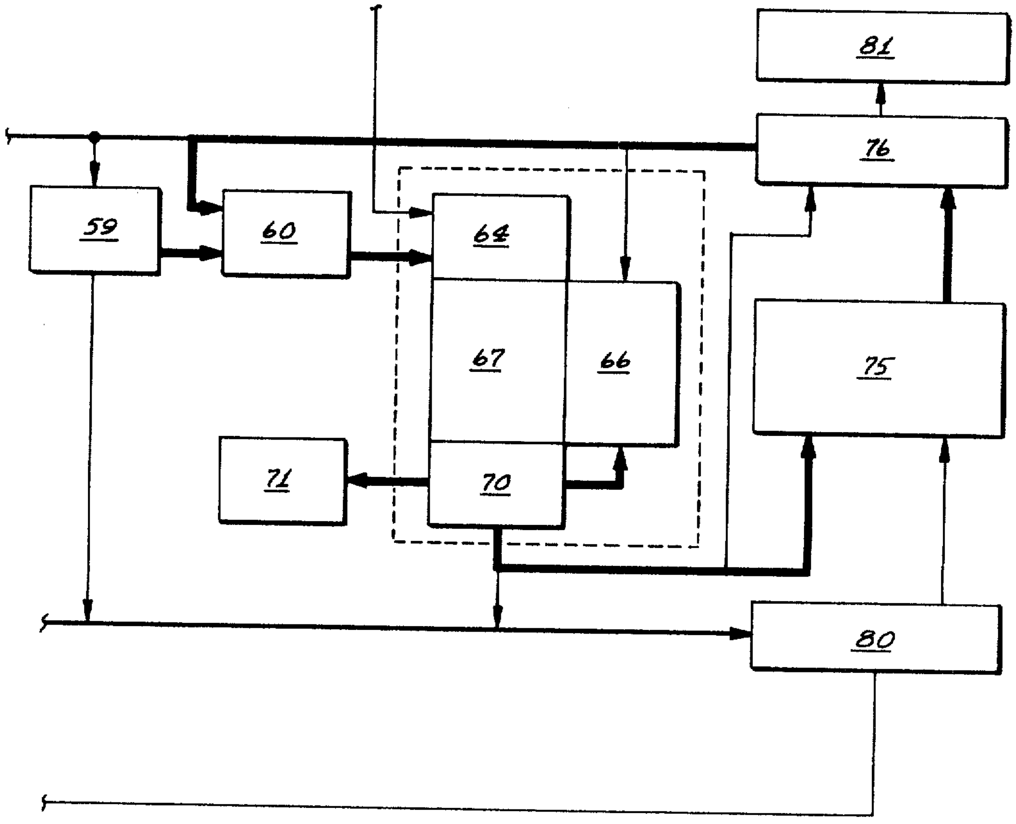

FIGURE 11 is a block diagram of a portion of the system shown in FIGURE 3 useful for illustrating instruction cycles.

Figure 12:
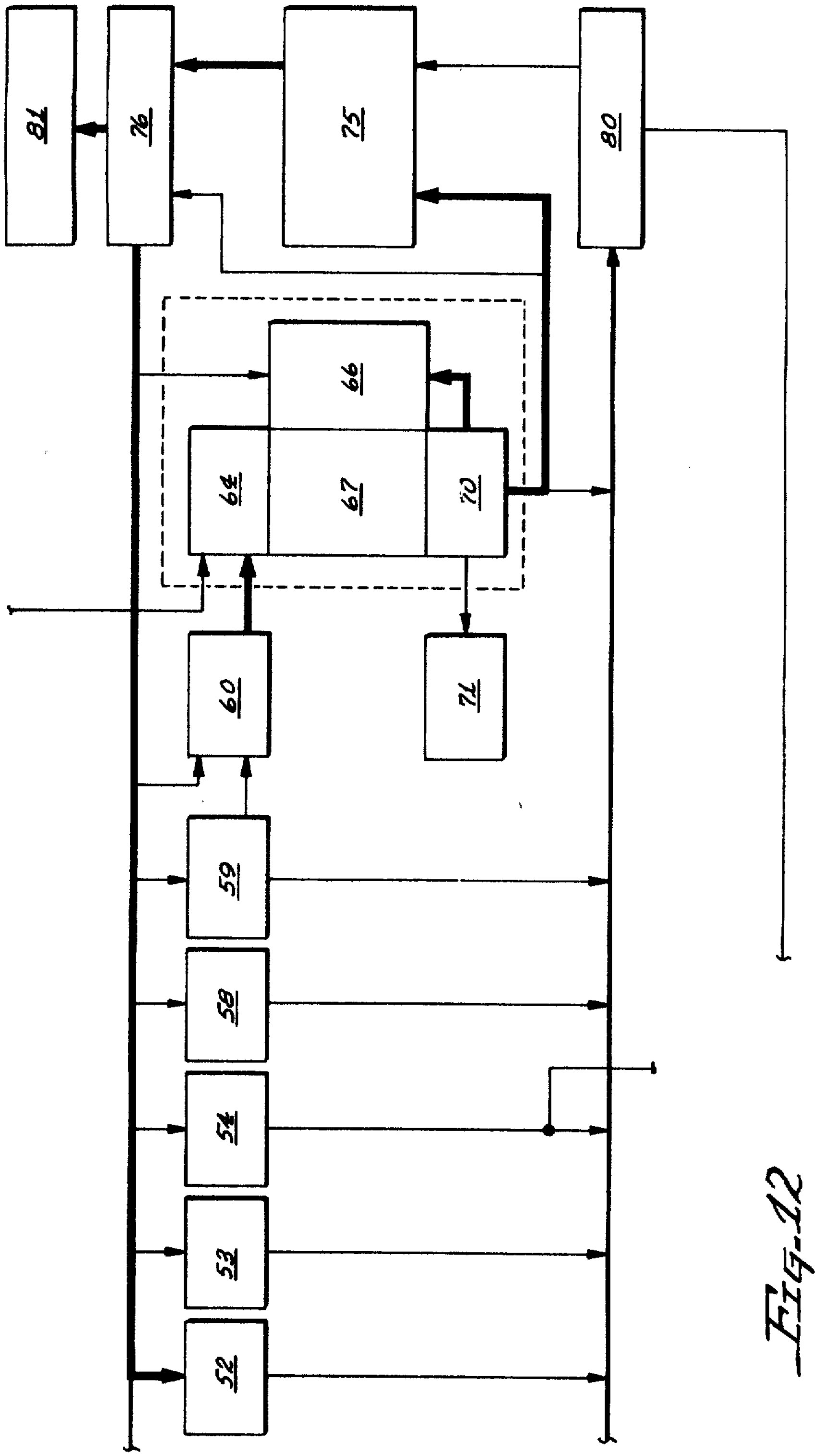

FIGURE 12 is a diagram of a portion of the block diagram of FIGURE 3 useful for illustrating the instruction "load A register."

Figure 13:
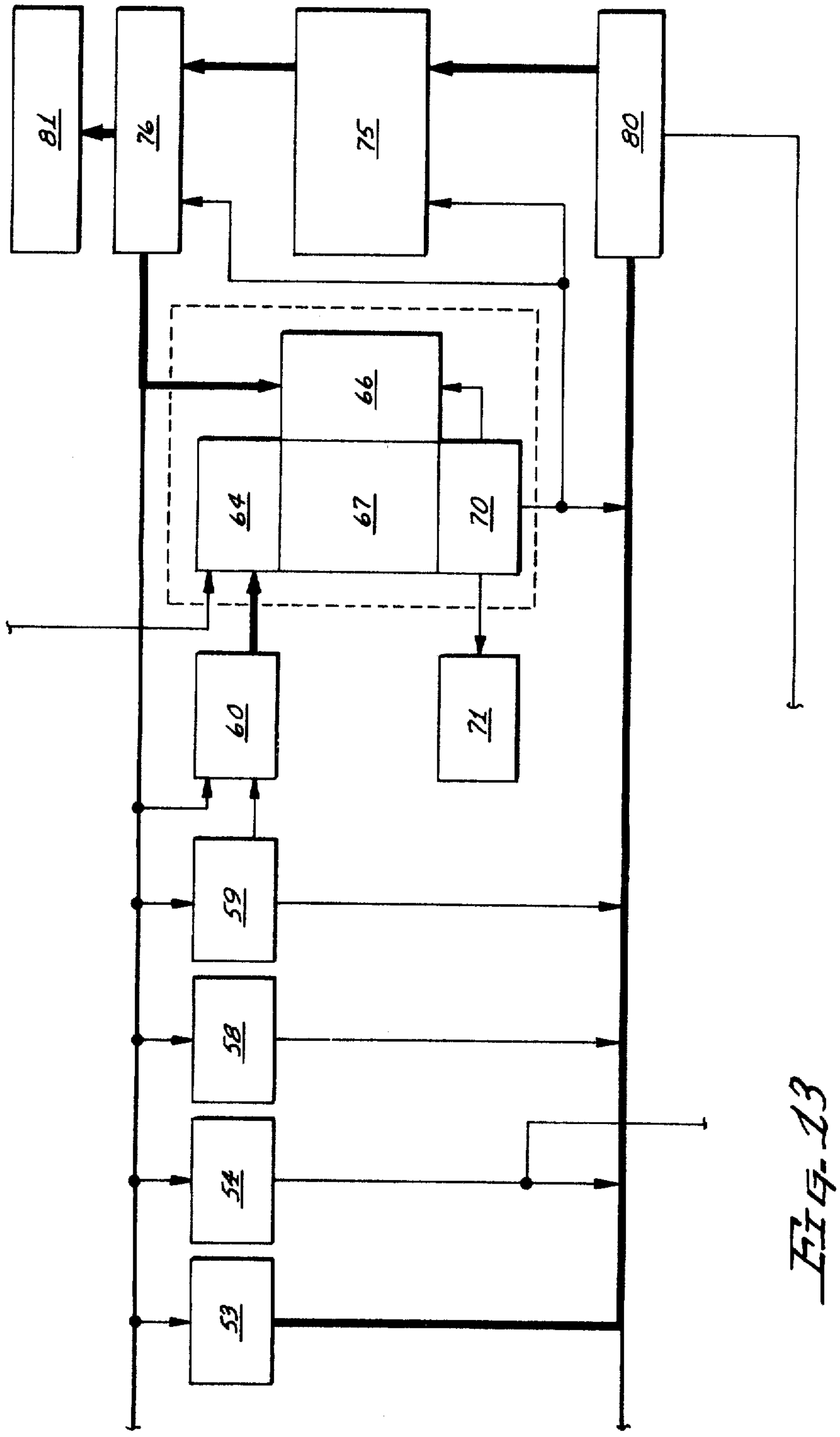

FIGURE 13 is a block diagram of the portion of FIGURE 3 useful for illustrating the execution of the instruction "store B register."

Figure 14:
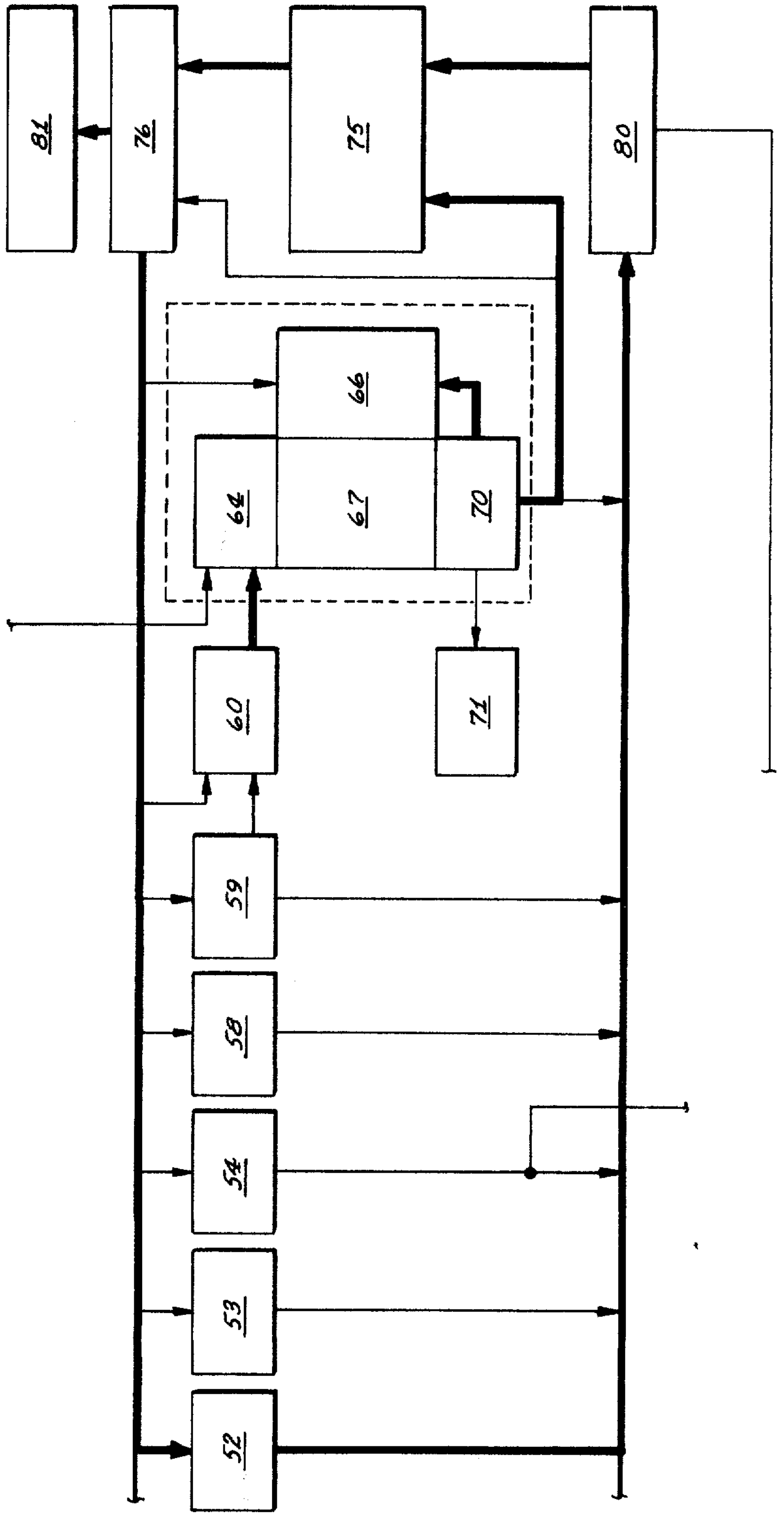

FIGURE 14 is a diagram of a portion of FIGURE 3 useful for illustrating execution of the instruction "add memory to A register."

Figure 15:
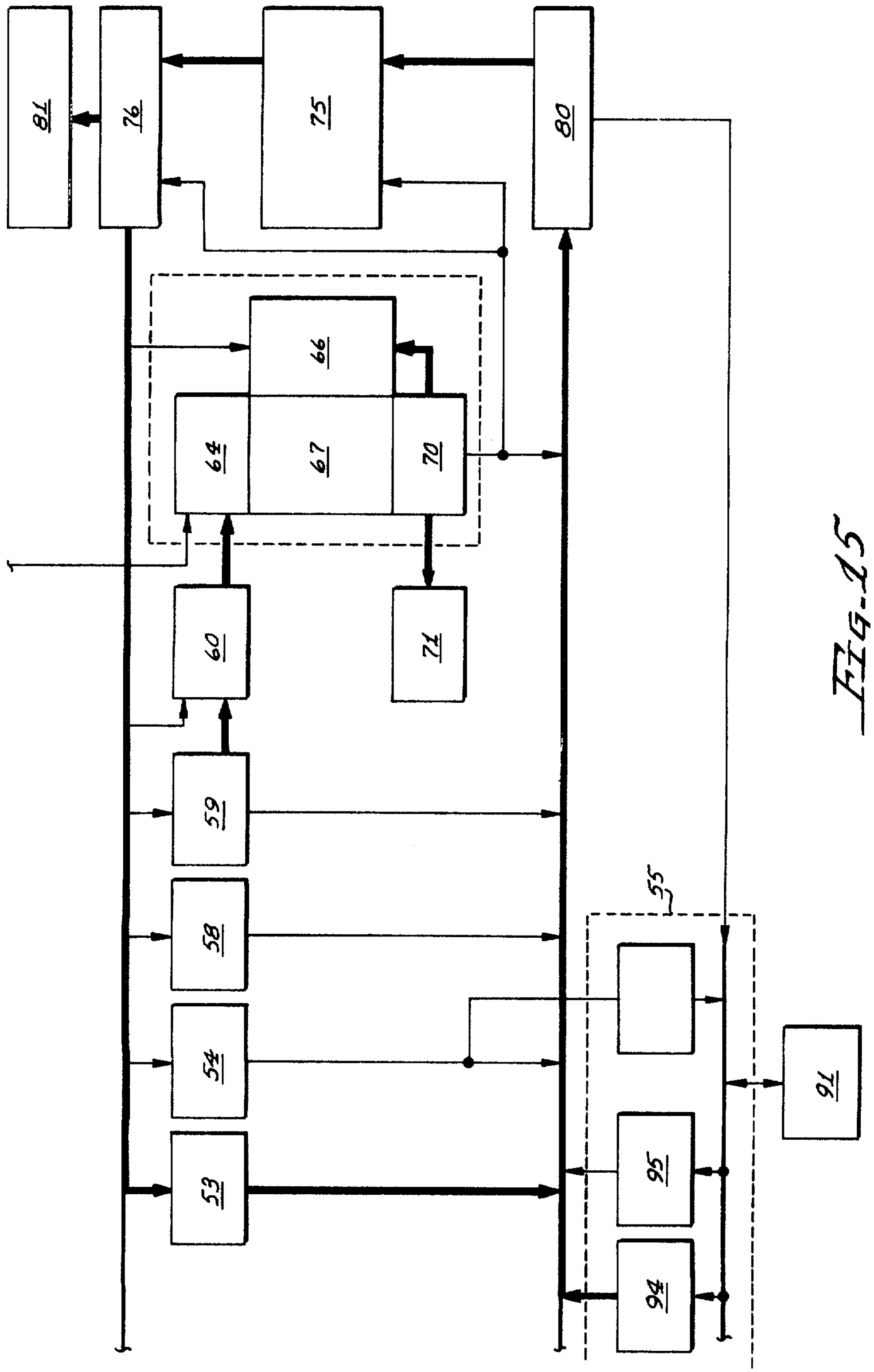

FIGURE 15 is a diagram of a portion of FIGURE 3 useful for describing the execution of the instruction "shift right 1."

Figure 16:
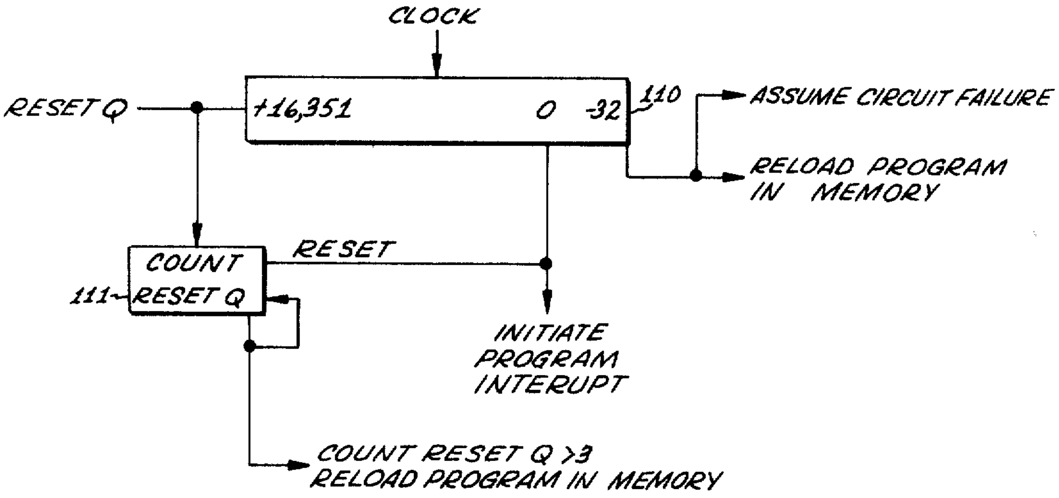

FIGURE 16 is a schematic block diagram of the Q counter of the present invention.

Figure 17:
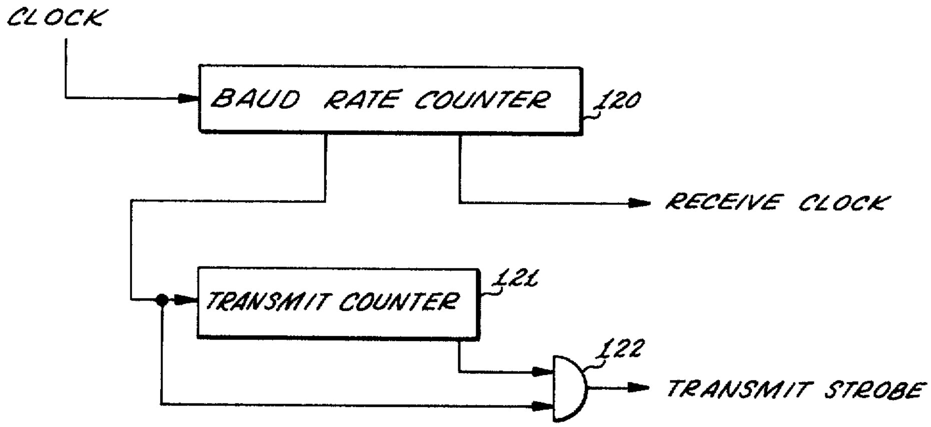

FIGURE 17 is a schematic block diagram of a portion of the bit buffer unit of the present invention.

Figure 18:
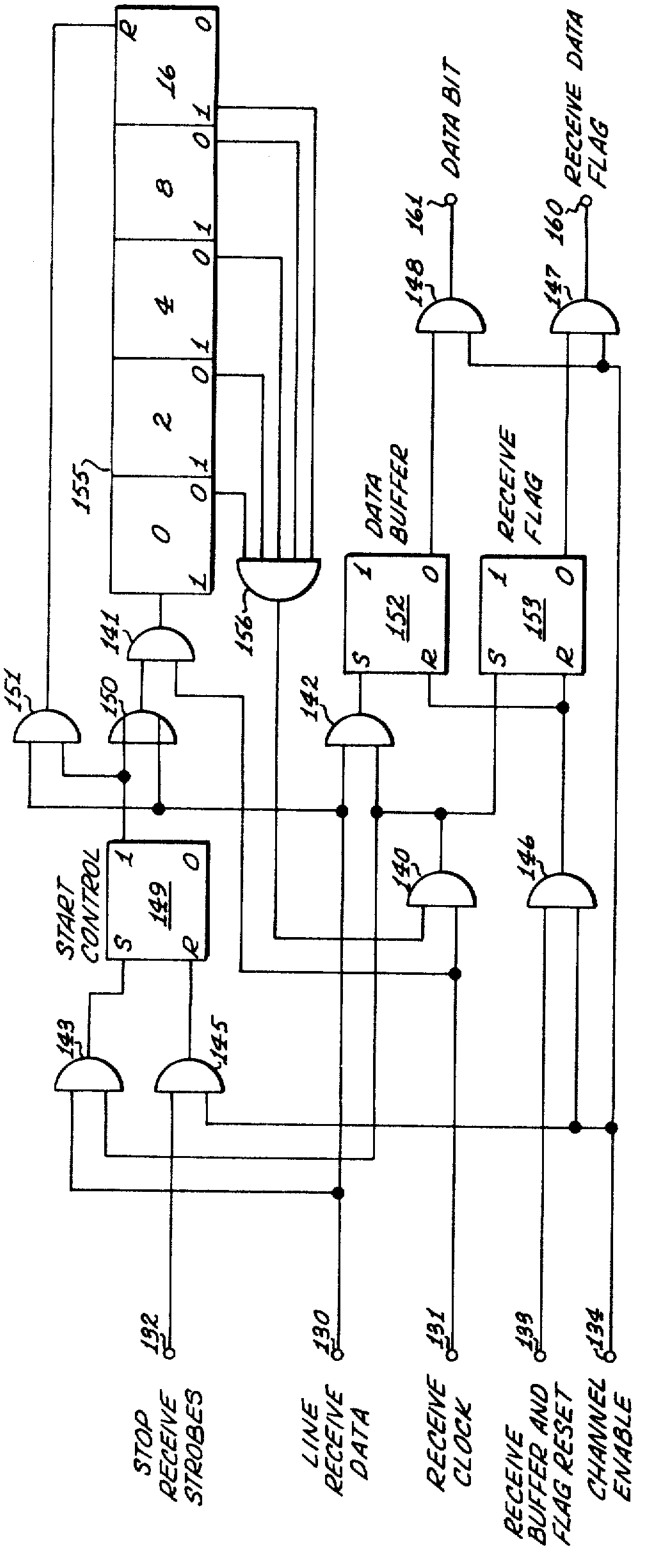

FIGURE 18 is a schematic block diagram of a second portion of the bit buffer unit of the present invention.

Figure 19:
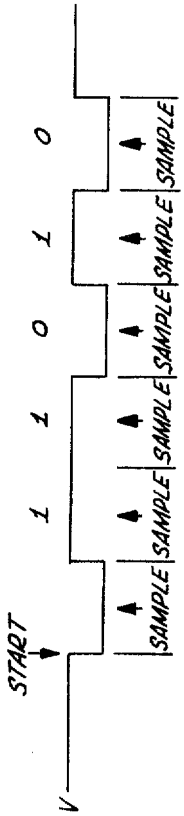

FIGURE 19 is a schematic illustration of an incoming pulse-coded character useful for illustrating the manner in which incoming information is sampled to determine the information content thereof.

Figure 20:
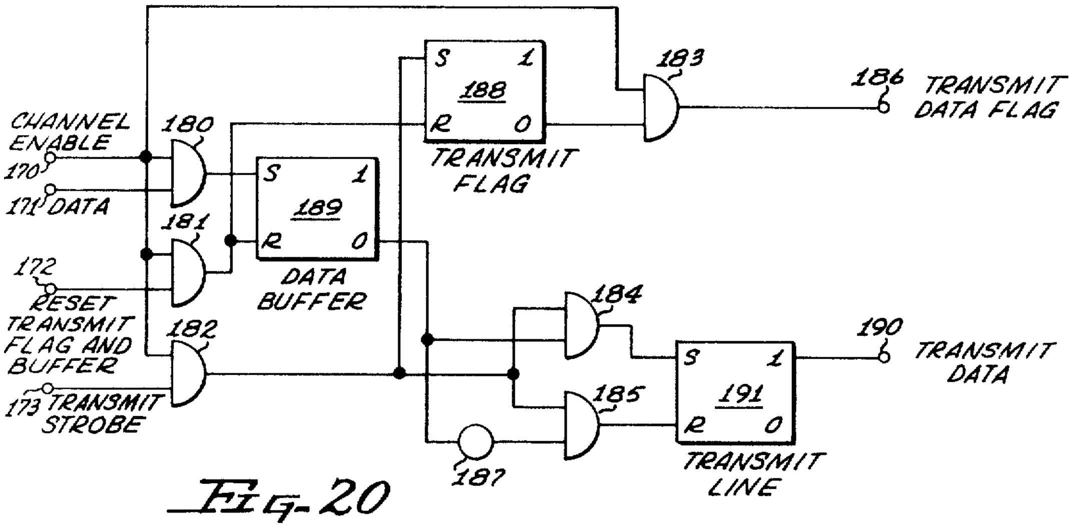

FIGURE 20 is a schematic block diagram of a third portion of the bit buffer unit of the present invention.

Figure 21:
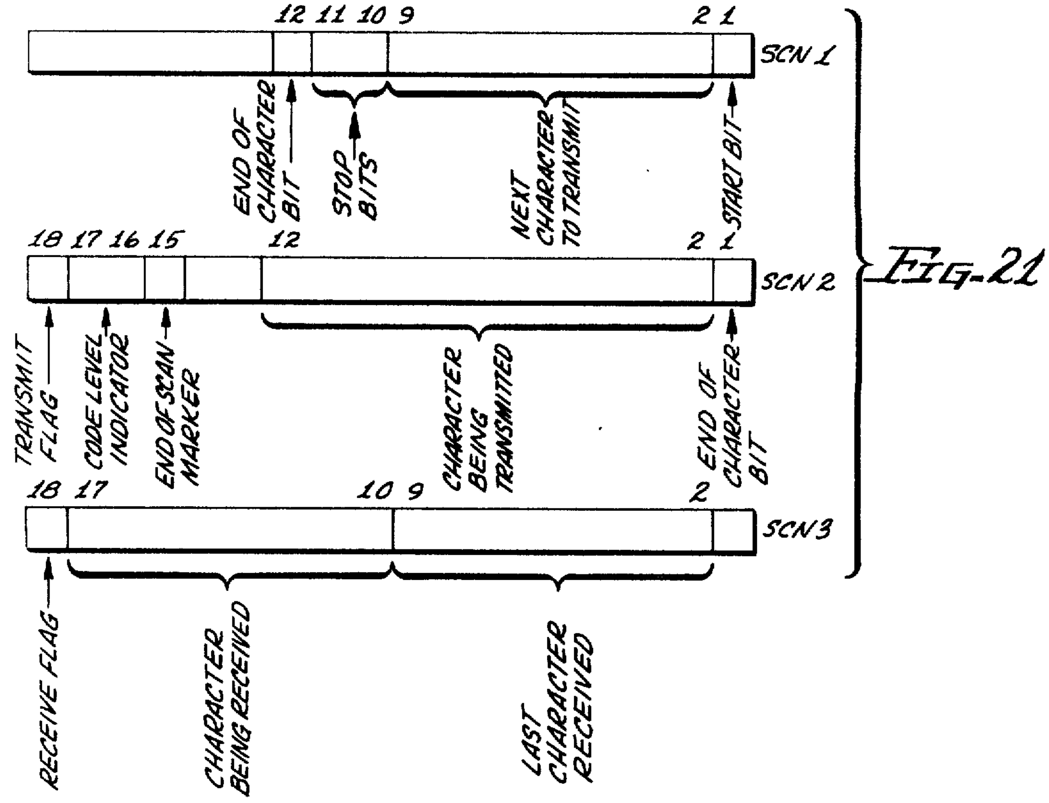

FIGURE 21 is a diagram of the three scan words stored in the memory of the present system for each channel to be served.

FIGURES 22, 23, 24, and 25 illustrate the flow of information between registers and the memory, and indicate the logical decisions being executed by the system of the present invention during the operation of the instruction "hardware scan."

Since the present invention pertains to data processing and to communication techniques, the description thereof can become very complex; however, it is believed unnecessary to describe all of the details of the transmission system and the processing system to completely describe the present invention. Therefore, most of the detail that is relatively well known in the art will be omitted from this description. Even though details will be eliminated, a basic description will be given of the entire system to enable one skilled in the art to understand the environment in which the present invention is placed. Accordingly, reference is made to FIGURE 1 showing a simplified block diagram of the data processing portion of the data communications processor of the present invention.

Figure 1:
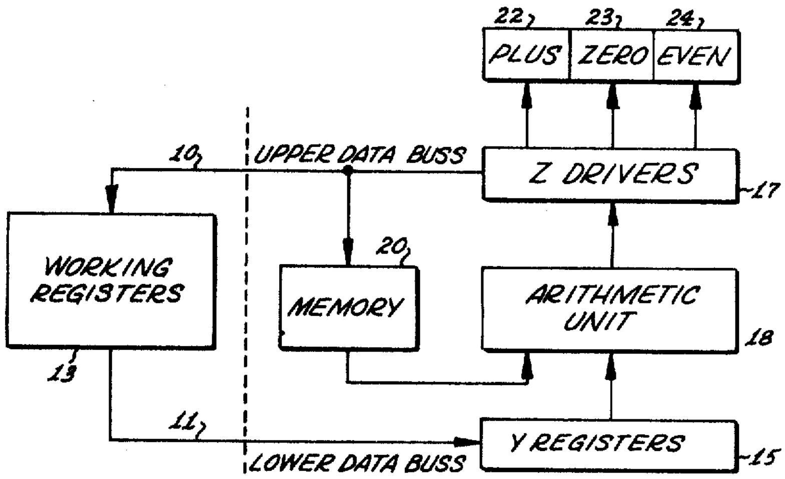
FIGURE 1 is a simplified block diagram of a data communication processor constructed in accordance with the teachings of the present invention.

Referring to FIGURE 1, the processing system is provided with two data busses 10 and 11, each of which acts as a main channel for information, including data and instructions, to and from the information manipulation portion of the system. The system is provided with working registers 13 which receive the instructions and data for temporary storage prior to the utilization of this information elsewhere. The data busses 10 and 11 communicate with the working register 13 and connect the latter to a Y register 15 for receiving information from the working register, and Z drivers 17 for transmission of information to the working registers. The Y register acts as temporary storage for operands prior to the insertion of the operands into an arithmetic unit 18 to be operated upon in accordance with a stored program. A random access memory 20 is provided and is utilized to store instructions and data; the memory is connected to the arithmetic unit 18 to supply the latter with the necessary information for operation upon the operands received by the arithmetic unit from the Y register. The arithmetic unit provides the usual functions of addition, subtraction, the logic functions of AND, OR exclusive OR as well as shifting functions such as shift left, shift right, circulate right or left, and may further provide bit change functions in certain circumstances. The results transmitted from the arithmetic unit are supplied to the Z drivers. The Z drivers store the results of the computation from the arithmetic unit and may deliver these results to memory or to a working register. A unique feature is provided at this point in the processing system of the present invention in that the results of information manipulation stored in these Z drivers is sampled by three flip-flops 22, 23, and 24, which provide a test of the contents of the Z drivers and yield the test condition of the information in the Z drivers. The respective flip-flops indicate a plus, zero, or even condition of the information in the Z drivers. The data processing system of FIGURE 1 is placed in its environment as a communications processor in FIGURE 2.

Figure 2:
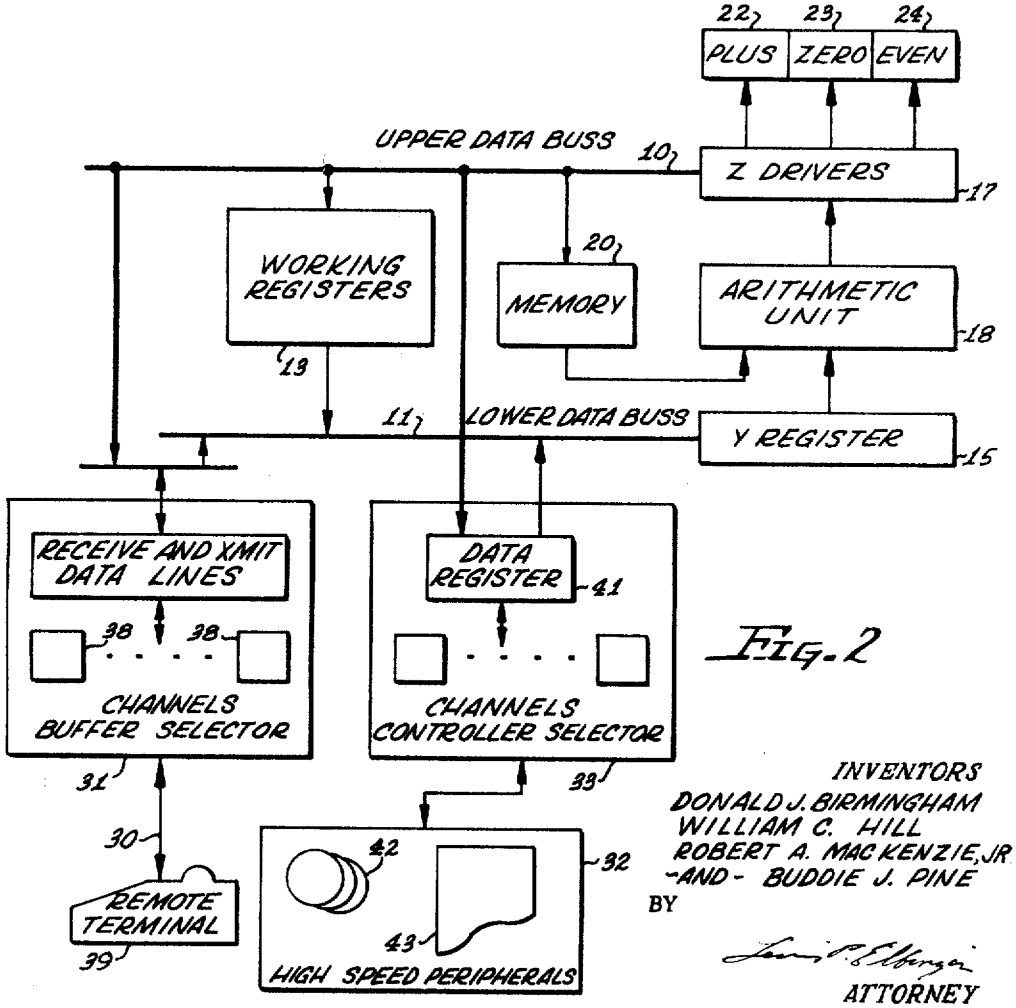
FIGURE 2 shows a simplified block diagram of a communication processor constructed in accordance with the teaching of the present invention and illustrating data flow from remote terminals and high speed peripherals to and from the data processor.

Referring to FIGURE 2, the working registers 13, memory 20, Y register 15, arithmetic unit 18, Z drivers 17, and status flip-flops 22, 23, and 24 are interconnected as in FIGURE 1 by the upper and lower data busses 10 and 11 and are also connected to input/output channels 30 through a buffer selector 31 and are connected to specific peripheral equipments 32 through a controller selector 33. The buffer selector communicates with the upper and lower data busses receiving information from the upper data bus and transmitting information to the lower data bus. The information flow in the buffer selector is through receive and transmit data lines to any of a plurality of respective channels 30 each of which has a corresponding buffer 38. Communicating with the buffer selector is a plurality of remote terminals 39 each connected to a corresponding one of the channels.

The controller selector 33 receives information from the upper data bus and transmits information to the lower data bus. The information is buffered in the controller selector by a data register 41 which provides information flow to any one of a plurality of channels. Each of the channels of the controller selector may be connected to the controller of a peripheral equipment 32 such as a high speed random access disc memory 42, a high speed printing unit 43, etc. The overall data flow indicated in FIGURE 2 represents the gross function of data and instruction flow of the data communications processor of the present invention. An expansion of the system as shown by the gross block diagram of FIGURE 2 results in a more detailed diagram such as that shown in FIGURE 3.

Referring to FIGURE 3, the respective portions of the data communications processor of the present invention are shown in block form and represent a logical level which need not be expanded further to describe the present invention except for specific portions thereof as described later. Referring to FIGURE 3, the working registers of the processing system are designated as the A register 52 and B register 53. Each of these registers is an 18 bit register and is utilized as principal working registers of the system. These registers are connected to receive information from the upper data bus 50 and transmit information to the lower data bus 51. Similarly, a C register 54 is provided and is capable of storing 7 bits. The C register is utilized to specify the input/output channel and may also be utilized as an index register to implement indirect addressing. The C register is also connected to receive information from the upper data bus and deliver information to the lower data bus; however, the C register also communicates directly with a buffer selector 55 (shown in dotted lines in FIGURE 3) and specifically to the buffer address decode portion of the buffer selector.

A unique counting feature is provided in the present invention by a Q counter 58 which, in the present embodiment, is a 14 bit counter connected to receive information from the upper data bus and deliver information to the lower data bus. The Q counter acts as an elapsed time clock and is instrumental in implementing several unique features to be described later. A 15 bit P counter 59 is connected to the upper data bus and provides information to a lower data bus and to a 15 bit L register 60. The P counter performs the function of storing the memory address of the next instruction and provides this information to the memory address register or L register. As noted in FIGURE 3 the L register also receives information from the upper data bus. The L register communicates directly to the memory address lines 64 of the memory unit 65. The memory address lines and the memory drivers 66 retrieve and store information in the magnetic core memory 67. An M register 70 receives the information retrieved from the magnetic core memory and provides this information to the memory drivers for reinserting the information at the location in the magnetic core memory from which it was retrieved, and for providing this information to an instruction decoding register shown as the N register 71. The memory unit also receives information from the upper data bus directly to the memory drivers and may receive information from the controller selector as will be explained later. The memory output register (M register) provides the retrieved information directly to the arithmetic unit 75, the lower data bus, and to the Z drivers 76. The arithmetic unit also receives information from the 18 bit Y register 80 and provides the results of the computations in the arithmetic unit to the 18 bit configuration of Z drivers. The results contained in the Z drivers are always sampled by the branch flip-flops 81 of plus, zero and even. The upper and lower data busses are illustrated in FIGURE 3 as heavy dark lines to indicate that the major data flow occurs over these busses. The internal function drivers 83 connected to the upper data bus may be utilized for activating special control functions such as resetting parity bit flip-flops and other housekeeping functions. The internal status lines 84 connected to the lower data bus may be used to test internal conditions and to maintain a check on the necessary housekeeping functional performance.

The buffer selector 55 includes a transmit data driver 90 for communicating information from the upper data bus to the buffers 91 of the respective channels. Also, external function drivers 93 are provided to send control signals to the respective buffers. Corresponding to the transmit data drivers and the external function drivers, are the receive data lines 94 and the external status lines 95. The latter units receive information from the respective buffers in the form of data signals and provide a means to ascertain buffer conditions. A plurality of buffers 91 are each connected to the buffer selector and communicate with a remote channel (not shown in FIGURE 3); one buffer 97 is allocated to a paper tape reader for reading into the system a program intended for use in the particular application.

A controller selector 100 includes a data register 101 capable of storing a word of information into a configuration according to the particular peripheral equipments being addressed. The data register receives information from the upper data bus and transmits information to the lower data bus. The controller selector also includes an address register 102 for addressing memory of the data communications processor to permit information being transferred through the data register to be directed to the magnetic core memory at the appropriate location.

Insert switches 105 may be provided to "insert" into the system via the lower data bus the appropriate test information necessary for trouble shooting or system check-out. The insert switches will normally be located on a maintenance panel for access by appropriate product service personnel. In addition to the communications channels that may be connected into the respective buffers of the buffer selector, data processing systems may also gain access to the respective channels and to the data communications processor of the present invention by connection through one of the respective buffers. In this manner, one or many data processing systems may be connected via the data communications processor of the present invention to form a computation network gathering and sending information through nationwide common carrier facilities while exchanging information between respective computers and remote locations.

To better understand the flow of information and control signals throughout the system of the present invention, a brief description of instruction and data formats will now be given. Referring first to the instructions, two general groups of instructions present themselves:

(1) Non-general instructions—those for which the low order bits specify a memory address.

(2) General instructions—those for which the low order bits contain information to be used by the instruction.

The processing system of the present invention operates upon an 18 bit word broken into fields in accordance with the designated instruction format or data requirements. General instructions may be recognized by the fact that the three high order bits are all zeros.

Figure 4:
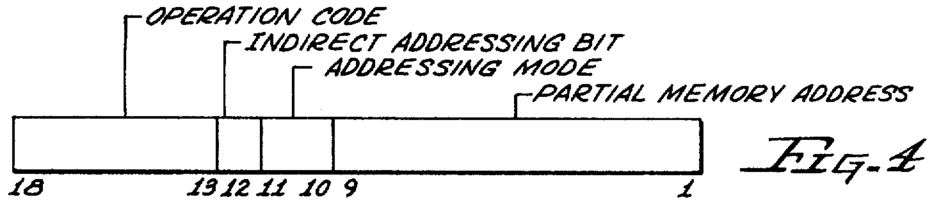
FIGURE 4 is a diagram of a non-general instruction illustrating the four fields thereof.

One format is utilized for non-general instructions and three formats are used for general instructions, register transfer instructions, status line and function driver instructions, and C register instructions. The non-general or memory reference instructions have four fields; referring to FIGURE 4, these fields may be seen as field 1 (partial memory address), field 2 (addressing mode), field 3 (indirect addressing bit) and field 4 (operation code). The three formats utilized for general instructions are shown in FIGURES 5, 6 and 7 respectively. Referring to FIGURE 5, the format utilized for register transfer instructions is shown. The 18 bit word is broken into three fields the first of which indicates the TO registers, field 2 represents FROM registers, and field 3 represents the operation code. FIGURE 6 shows the format for status line and function driver instructions wherein the instruction consists of two fields the first of which indicates the lines or drivers involved, and the second field indicates the operation code.

FIGURE 7 illustrates the instruction format for C register instructions and which have two fields: The first field representing the value, and the second field representing the operation code.

The representation of information in memory may take any of several forms. One possible form for alphanumeric data would be the division of the 18 bit word into three 6 bit characters each character having any one of 64 possible assigned meanings. An illustration of an alphanumeric data word in memory is shown in FIGURE 8 wherein the three data fields are assigned 6 bits. It will be obvious that the alphanumeric configuration of the 18 bit word may assume other forms; for example, two 8 level Teletype characters, still containing parity and control bits, are shown as a data word in memory in FIGURE 9. It may be noted that the control bits, the data bits, and the parity bits are maintained in the stored word.

Numeric data may be stored in the binary notation and negative numbers may conveniently be represented by reserving the 18th bit as a sign flag that the number represented in the first 17 bits is a two's complement number. Thus, the 18th bit is not a sign bit in the sense of an algebraic sign; rather, the 18th bit will always be a 1 when the numeric data represented by the remaining seventeen bits is actually a two's complement. Referring to FIGURE 10, six possible bit configurations are represented in binary representation for numeric data to be stored in the system of the present invention. The first number represented is 0, the second and third numbers are a plus and a minus 5 respectively, while the fourth number is a negative 1. The fifth and sixth numbers represent the largest negative and positive number respectively in the binary notation using the 18 bits available.

It is deemed unnecessary to list all of the instruction available in the communications processing system of the present invention; however, to familiarize those skilled in the art with the general data flow in the system representative instructions will be described in connection with accompanying figures. Basically, the function of the instruction cycle is the initial decoding of the instruction and the generation of the desired memory address and its transfer to the L register. Referring to FIGURE 11, a portion of the system is shown. At the beginning of the instruction cycle, the address of the next instruction is transferred from the P counter 59 to the L register 60. Subsequently, after the transferal of the address of the next instruction from the P counter, the P counter is incremented by 1. The contents of the L register are transferred to the memory address lines 64, thus providing readout of the memory to the M register 70. After the instruction has been read from the core memory and placed in the M register, the M register provides the contents therein to the N register 71 where the instruction is decoded. Simultaneously, the information in the M register is applied to the memory driver 66 for reinsertion into the core memory. After the instruction is decoded, the appropriate section of the arithmetic unit 75 is enabled and the information is applied to the arithmetic unit from the M register. The results from the arithmetic unit are applied to the Z drivers 76 where it is subsequently provided to the L register for addressing memory on the next cycle.

Referring to FIGURE 12, a schematic flow chart of the instruction "load A register" is shown. The operand address in the L register 60 is transferred to the memory address line 64 for addressing the memory 67. The contents at the specified address in memory are read into the M register 70 and transferred through the arithmetic unit 75 to the Z drivers 76. The contents of the Z drivers are transferred to the A register 52. Simultaneously, with the transfer of the contents of the M register to the arithmetic unit, the contents of the M register are being regenerated by the memory drivers 66 and reinserted into the magnetic core memory. The branch flip-flops 81 store the plus, zero, and even conditions of the contents of memory at this location. Referring to FIGURE 13, an additional representative execution cycle is shown for the instruction "store B register." The operand address in the L register 60 is transferred to the memory address lines 64 for addressing memory 67. The contents of the B register 53 are transferred to the Y register 80 while the memory is being read out. The contents of the Y register are then transferred to the Z drivers 76 through the arithmetic unit 75. The Z drivers, via the upper data bus, apply the contents thereof to the memory drivers for generation in memory at the location specified by the L register. Thus, the contents of the B register have been transferred to the magnetic core memory at the address specified by the contents of the L register. The branch flip-flops store the plus, zero, and even conditions of the contents of the B register.

Referring to FIGURE 14, the execution cycle of the instruction "add memory to A register" is shown. The operand address in the L register 60 is transferred to the memory address lines 64 for accessing memory 67. While the memory is being read out, the contents of the A register 52 are transferred to the Y register 80. The contents of the magnetic core memory at the location specified by the L register are placed in the M register 70 and transferred to the arithmetic unit 75 simultaneously with the transfer of the contents of the A register through the Y register. The binary arithmetic sum of the M register and A register is generated by the arithmetic unit and transferred to the Z drivers 76. The sum present in the Z drivers is transferred to the A register while the contents of the M register are applied to the memory drivers for regeneration and reinsertion of the information in the magnetic core memory. The branch flip-flops store a plus, zero, and even conditions of the binary arithmetic sum of the A register and memory location.

Referring to FIGURE 15, the execution cycle of the instruction "shift right 1" is illustrated in conjunction with the receipt of information from a buffer. At the beginning of the instruction cycle, the address of the next instruction is transferred from the P counter 59 to the L register 60; subsequently, the P counter is incremented by 1. The L register transfers the contents thereof to the memory address lines 64. The contents in memory 67 at the location specified by the information transferred from the L register to the memory address lines is placed in the M register 70 and is subsequently transferred to the N register 71 where the instruction is decoded. After the instruction is decoded, the contents of the B register 53 are transferred to the Y register 80. Simultaneously with the reading of the instruction from the core memory the contents contained in the receive data lines 94 are transferred to the Y register. The logical disjunctive "OR" of receive data lines and B register is performed in the Y register and transferred to the arithmetic unit 75. The arithmetic unit performs the shift right 1 function on the Y register contents in accordance with the decoded instruction provided to the N register, and the results thereof are transferred to the Z drivers 76. The results contained in the Z drivers are transferred to the B register and, simultaneously, the branch flip-flops 81 store the plus, zero, and even conditions of the new contents of the B register. Simultaneously with the transfer of the memory contents in the M register to the N register, the M register also transfers the contents of the memory driver for reinsertion into the memory at the specified location.

The above description of execution cycles of the various instructions illustrates the general information flow in the system in response to respective instructions.

Referring now to the Q counter, the unique provisions for timing and for servicing Bit Buffer Units will now be described. Referring to FIGURE 16, a schematic block diagram is shown of the real time clock or Q counter of the present invention. The Q counter comprises a counter 110 of any well known construction and, in the present embodiment, is a 14 bit counter. The counter is reset under program control by a reset Q command, thus loading the Q counter with a desired number. The particular number will depend on the rate at which the counter is to count, the time desired before resetting the counter, and the particular program under operation. In the embodiment shown in FIGURE 16, the reset Q signal automatically resets the Q counter to +16,351. The counter receives a clock signal and is decremented by 1 for each clock received. Simultaneously with the application of the reset Q signal to the Q counter, the signal is applied to a "count reset Q counter" 111 which maintains the total number of times the Q counter has been reset.

As the Q counter is decremented to zero, an initiate program interrupt signal is supplied by the counter to permit the system to interrupt the program and service channels having information to be received and to service those channels for which the system has information. The program interrupt permits a subroutine or subroutines to be initiated; however, the Q counter will continue to count to −32. The subroutine instigated by the program interrupt signal from the Q counter is charged with responsibility of resetting the Q counter before the counter reaches the −32 count. If the subroutine, or if that portion of the program controlling after program interrupt, fails to reset the Q counter by the end of the −32 count, the Q counter initiates a reload signal which automatically reloads the program in the appropriate locations in memory from the program stored on the paper tape unit connected to the paper tape buffer of the buffer selector. An appropriate warning signal is also provided simultaneously with the reload signal indicating that the Q counter was not reset at the appropriate times.

The count reset Q counter 111 maintains a count of reset Q signals applied to the Q counter. The count reset Q counter is reset when the Q counter reaches a zero count and a program interrupt signal is initiated. However, if the count reset Q counter reaches a count of three, a reload program in memory signal is generated to automatically reload the program in the appropriate locations in memory from the paper tape in a manner similar to that when the Q counter counted to −32. Simultaneously with the latter action, the count reset Q counter is reset to zero. The function of the latter counter prevents a program dead loop that continuously reloads or resets the Q counter without permitting the counter to count to zero thereby initiating a program interrupt. The prevention of a loop of this sort reduces the probability of information loss caused by excessive time in operation on a program without program interrupt to service the respective channels. Thus, the Q counter insures proper operation of programs by detecting when programs fail to initiate a reset Q counter. The Q counter also protects against dead loops including instructions to load the Q counter by counting the number of times the counter has been loaded since the last program interrupt; further, by initiating a program interrupt at a count of zero, the Q counter insures the periodic execution of appropriate programs to service channels thereby prohibiting the loss of information present at the incoming channel.

When the Q counter counts to zero, the system completes the instruction currently in process and subsequently stores the contents of the P counter in a predetermined location in memory set aside for that purpose. The L register subsequently addresses the succeeding location, also set aside for this particular purpose, and retrieves the address stored in that location and places the address in the P counter. The appropriate subroutine starting address has thus been retrieved from memory and placed in the program counter and, by gating contents of P counter through the L register, the subroutine may be executed while the next instruction of the program previously being operated on is stored in a known location in memory. Upon the completion of the subroutine, the subroutine instruction will address the appropriate storage location of the main program and place that instruction in the P counter to thereby return the system to the original program. Concurrently therewith, the Q counter will be reset and will again decrement to zero and reinitiate a program interrupt. As stated previously, if the subroutine fails to reset the Q counter and the Q counter counts to −32, the program is automatically reloaded into memory from the paper tape connected to the paper tape buffer of the buffer selector.

The data communication processor of the present invention includes a bit buffer unit which facilitates the connection of the processor to the respective incoming and outgoing channels. As the title indicates, each buffer provides the temporary storage for a single bit of information until the processor addresses the respective buffer and retrieves the stored information. Obviously, since there are several incoming lines, the processor will have to address each of the buffers in sufficient time to permit the retrieval of the respective stored information in all buffers before the succeeding bits are received over the transmission lines. Since the bit rate, or baud rate, of data transmission systems is substantially slower than the operating speeds of the data processor, the processor can readily address, sequentially, all of the buffers and have sufficient time to carry on processing in accordance with a stored program before having to return to the buffers to retrieve further information. The buffers also serve the purpose of storing bits of information provided to the buffer by the processor prior to sending the bits of information over the transmission facilities. The bit buffer unit of the data communication processor of the present invention is schematically shown in FIGURES 17, 18 and 19. Referring to FIGURE 17, the control portion of the bit buffer unit is shown. A baud rate counter 120 is shown receiving clock pulses from the clock source of the communications processor. The baud rate counter produces output pulses that are a submultiple of the clock pulses. The clock pulses received from the clock of the data processor may generally be in the vicinity of 200 kc. or higher; to reduce this frequency to a frequency usable for data transmission purposes, the baud rate counter 120 reduces the clock rate to a value of 32 times the baud rate. The baud rate counter pulses (32 times the baud rate) are utilized as hereinafter set forth as the "receive clock" and are also applied to a transmit counter 121. The transmit counter 121 reduces the output of the baud rate counter to the actual baud rate being utilized by the transmission lines. The baud rate may conveniently be any of the transmission rates commonly acceptable to common carriers and are usually in the order of 45 bits per second to 3,000 bits per second. Accordingly, the output of the transmit counter 121 is a pulse having a frequency equal to the baud rate. The output of the transmit counter and the output of the baud rate counter 120 are applied to the AND-gate 122. The output of the AND-gate 122 provides a transmit strobe pulse useful for timing the output pulses from the data communications system to the transmission lines.

The portion of the bit buffer unit relating to the receive function is shown in FIGURE 18. The inputs to the bit buffer unit for the receive function comprise the data applied to the terminal 130 (received from the transmission line), the receive clock signal applied to the terminal 131 from the baud rate counter of FIGURE 17, a stop receive strobe signal applied to terminal 132 from data processor, a receive buffer and flag reset signal applied to the terminal 133 from the data processor, and a signal applied to the terminal 134 to "enable" the specific channel of which the bit buffer is a part. Thus, when the processor addresses a particular bit of buffer unit, the channel enable signal applied to that bit buffer enables the buffer to receive the incoming data.

The receive clock signal derived from the baud rate counter, and applied to the terminal 131, is simultaneously applied to an AND-gate 140 and to AND-gate 141. The data applied to the terminal 130 is simultaneously applied to AND-gates 142 and 143. The channel enable signal applied to the terminal 134 is simultaneously applied to AND-gates 145, 146, 147, and 148. The stop receive strobe signal applied to terminal 132 is also applied to the AND-gate 145 and the receive buffer and flag reset signal applied to the terminal 133 is also connected to the AND-gate 146. Three flip-flops are provided in the receive portion of the bit buffer unit as indicated in FIGURE 18. The counter control flip-flop 149 is connected through its "1" output to an OR-gate 150 and to one input of an AND-gate 151. A data buffer flip-flop 152 is connected through its "0" output terminal to the AND-gate 148, and the receive flag flip-flop 153 is connected through its reset or "0" output to the AND-gate 147. A counter 155, comprising five cascaded flip-flops, is shown connected to the output of the AND-gate 141. Each flip-flop, or stage, of the counter 155 is connected through an AND-gate 156 to the AND-gate 140. The counter 155 is a five bit binary counter which, when considering the left-most flip-flop as having the lowest binary value will provide an output signal when the count reached the binary number 10000 or, in decimal terms, 16. Thus, the counter will provide an output through the conjunctive combination of the respective flip-flops when the count 16 is reached and will provide an output thereafter every 32 counts (each time the binary number 10000 occurs).

The operation of the schematic diagram of FIGURE 18 is as follows. When the particular bit buffer unit receives information from the transmission line applied to the terminal 130, and receive clock signals are also applied to the terminal 131, the receive clock signals are conjunctively combined in the AND-gate 141 with the output of the OR-gate 150. OR-gate 150 reecives the start pulse applied to the terminal 130 thereby providing a signal through the AND-gate 141 to the counter 155. As the counter 155 counts from its reset value of 0 to the count of 16, the outputs of the counter applied to the AND-gate 156 are conjunctively combined and applied to the AND-gate 140 to be combined therein with the receive clock signals applied to terminal 131. The conditions for conjunction in the AND-gate 140 having been satisfied, the signal provided by the AND-gate 140 is applied to the AND-gates 142 and 143. The application of the signal from AND-gate 140 to AND-gate 143 in conjunction with the start pulse still existing at terminal 130 provides an output from the AND-gate 143 to set the counter control flip-flop 149 to the "1" state. The output from the counter control flip-flops is thus applied to the OR-gate 150 to enable the counter 155 to continue counting after the count of 16. The output of the AND-gate 140 applied to the AND-gate 142 enables the start pulse applied to the terminal 130 to be conjunctively combined in the AND-gate 142 and sets the data buffer flip-flop 152 to the "1" state. The receive flag flip-flop 153 is set by the output of the AND-gate 140, thus yielding the conditions on AND-gates 147 and 148 that imply data to be received at the receive data flag terminal 160 and either a positive or a negative signal at the data bit terminal 161. The counter 155 continues to count from 16 through 32, back to zero and to 16 again. Thus, every time the counter 155 reaches the count of 16, the receive flag flip-flops 153 and the data buffer 152 are "strobed" so that the contents thereof are definitive of the existence of received data and value of the data respectively.

The explanation of operation may be facilitated by reference to FIGURE 19 which illustrates the manner in which the receive portion of the bit buffer unit of FIGURE 18 strobes the incoming data. The data applied to the terminal 130 is in the form of "mark" and "space" pulses commonly referred to in common carrier terminology. The pulses are actually relatively negative or positive values of voltage which are initiated by a pulse, or a drop in voltage, from the "mark" voltage. As indicated in FIGURE 19, this initial drop in voltage represents the start pulse, or start of the transmitted character. Depending on the code utilized, the number of bits in each character of the code, the number of succeeding pulses after the start pulse may vary considerably. The receive portion of the bit buffer unit of FIGURE 18 senses the start pulse and, since the receive clock applied to terminal 131 is at 32 times the baud rate (bit rate) the bit buffer receive portion is actually being strobed 32 times each bit, or pulse width. The counter 155 initially counts to 16 so that after sensing the start pulse, the pulse is sampled at $^{16}/_{32}$ of the receive clock period, or is sampled at exactly the midpoint of the pulse. After the initial count of 16, the counter 155 provides an output gating pulse from the AND-gate 156 every 32 clock periods. This provides a sampling pulse that samples the midpoint of each data bit or pulse provided to line receive data terminal 130. Thus, each pulse is sampled only during one brief clock period and only at the midpoint of the pulse at a predetermined time after the start signal of the character received. In this manner, noise is ignored and the start pulse is sampled only after it has been in existence at the terminal 130 for half of its designated period. As indicated in FIGURE 19, after the start pulse is detected, each pulse is sampled at the midpoint thereof until all bits have been sampled.

The transmit portion of the bit buffer unit of the present invention is shown in FIGURE 20. The channel enable signal, the same signal applied to terminal 134 of FIGURE 18, is applied to terminal 170 of FIGURE 20. The data to be transmitted, one bit at a time, provided by the processor is applied to terminal 171. The reset transmit flag and buffer signal, provided by the processor is applied to terminal 172. The transmit strobe from the transmit counter 121 of FIGURE 17 is applied to terminal 173. The channel enable signal is applied from terminal 170 to AND-gates 180, 181, 182, and 183. The transmit strobe is conjunctively combined with the channel enable signal in AND-gate 182 and the output thereof is applied to the transmit flag flip-flop 188 and to AND-gates 184 and 185. The reset transmit flag and buffer signal is conjunctively combined in AND-gate 181 and the output thereof utilized to reset the data buffer flip-flop 189 and the transmit flag flip-flop 188. The bits, or data to be transmitted, are conjunctively combined in AND-gate 180 with the channel enable signal, the output of which is applied to the data buffer flip-flop to cause the latter to assume the set state. The output of the transmit flag flip-flop is conjunctively combined in AND-gate 183 with the channel enable signal to provide a transmit data flag signal at terminal 186. The output of the data buffer flip-flop 189 is applied to the AND-gates 184 and 185 to be conjunctively combined therein with the output of AND-gate 182. The signal from the data buffer flip-flop 189 is inverted by an inverter 187 prior to its application to the AND-gate 185. AND-gates 184 and 185 are connected to the set and reset terminals respectively of the transmit line flip-flop 191. The output of the transmit line flip-flop provides a transmit data signal at the terminal 190.

The operation of the transmit portion of the bit buffer unit may be described as follows. When a particular channel is to be utilized to transmit data, the channel enable signal will enable AND-gates 180, 181, 182, and 183. The transmit strobe signals applied to terminal 173 are provided by the transmit counter 121 of FIGURE 17 and occur at the desired baud rate. Thus, the output of the AND-gate 182, applied to the transmit flag flip-flop 188 and to AND-gates 184 and 185 will be signals at the baud rate. The data to be transmitted is conjunctively combined in AND-gate 180 and applied to the set input terminal of the data buffer flip-flop 189. Depending on whether the particular data is a 1 bit or a 0 bit, the data buffer flip-flop 189 will assume a 1-state or a 0-state. Thus, the voltage level of the 0 output terminal will depend on the value of the input binary bit applied to the data terminal 171. Therefore, the value of the bit is stored in the data buffer flip-flop 189, and the value of the bit is applied to AND-gate 185. For example, if the output from the data buffer flip-flop 189 were of the proper logic level to cause AND-gate 184 to provide a relatively positive output, then the inverse of the signal provided by the data buffer flip-flop, which is applied to AND-gate 185, would prevent AND-gate 185 from providing a relatively positive output signal. Thus, only one of the AND-gates 184 and 185 will be permitted to gate a triggering logic level to the transmit line flip-flop 191 when each of the AND-gates is simultaneously strobed by the transmit strobe signal applied to the terminal 173. Therefore, depending on the logic value of the bit stored in the data buffer flip-flop, the transmit line flip-flop will either be set or reset, and the logic level provided at the 1 output terminal thereof, and applied to the output terminal 190, will represent the value of the data bit applied to the terminal 171. The transmit data flag signal provided at terminal 186, is derived through the state of the transmit flag flip-flop which, as indicated previously, is forced to the set state by the application of the transmit strobe through the AND-gate 182. Thus, when data is to be transmitted by the communication processor of the present invention, the channel enable signal is applied to the appropriate bit buffer unit. The transmit section of the appropriate buffer unit receives the data to be transmitted and stores the data (a single bit) in the data buffer flip-flop. A transmit strobe is provided at the appropriate baud rate from the transmit counter of the control section of the bit buffer unit. The information, previously stored in the data buffer, is subsequently transmitted at the appropriate baud rate, and the bit buffer unit may then be reset by the application of a reset transmit flag and buffer signal to the terminal 172 from the data processor.

It will be obvious to those skilled in the art that the AND-gates, OR-gates, flip-flops and counters described herein in connection with FIGS. 17, 18, 19, and 20 may take any of the usual forms commonly found in the data processing art. For example, the logic gates may be conventional diode gates or transistorized gating logic commonly known as nor logic. Similarly, the flip-flops having set and reset input terminals provide logic levels at both the 1 and 0 output terminals each of which may either be a 1 bit voltage level or a 0 bit voltage level. Thus, the 1 output at a given flip-flop may either be a binary 1 or a binary 0, and the contents of the flip-flop may readily be sampled merely by detecting the voltage level at either the 1 or the 0 output terminal.

The communication processing system of the present invention processes information in accordance with a stored prorgam as indicated previously. However, also as indicated previously, when the Q counter counts to zero, a program interrupt is initiated whereby the control of the processor is shifted to a subroutine which services the respective channels and bit buffers connected to the buffer selector. The system of the present invention provides a unique means for servicing the respective channels without requiring programmed control. This unique feature is provided by a single instruction known as hardware scan. Each channel having a bit buffer unit is allocated three words in memory designated as scan word 1, scan word 2, and scan word 3. When program interrupt is reached by the Q counter, and the subroutine provided in the program designates a scan instruction, control is immediately shifted to the stored scan words in memory and the control proceeds by retrieving and restoring the scan words for each channel from memory. The memory address of the respective scan words are sequential so that successive scan words may be withdrawn by indexing the memory address register. Referring to FIG. 21, the structure of the three scan words is shown. Scan word 1, designated as SCN 1, includes a start bit in position 1 and contains the next character to be transmitted in positions 2–9. Stop bits are contained in positions 10 and 11 and position 12 is reserved for the end of character bit. Scan word 2, designated as SCN 2, includes an end of character bit in position 1 and is provided with storage space for the character currently being transmitted in positions 2–12. Position 15 is reserved for the end of scan marker, positions 16 and 17 are reserved as code level indicators, and position 18 is reserved for the transmit flag. It may be noted that the code level indicator permits the use of 5, 6, 7, or 8 level Teletype codes.

Scan word 3, designated as SCN 3, includes a receive flag bit in position 18, space for the character being received in positions 10–17, and space for the last character received in positions 2–9. The operation of the hardware scan instruction may best be described by referring to FIGS. 22–25. The diagrams of FIGS. 22–25 illustrate the logic flow between registers and the memory, and indicate the logic decisions being executed during operation. Assuming that the Q counter has counted to zero and a program interrupt has been initiated, and the subroutine to be followed is indicated by a hardware scan instruction, the memory location of the first scan instruction is thus loaded by program into the P counter. The memory location loaded into the P counter is transferred to the L register for addressing the memory. The contents of the memory at the location specified by the contents of the L register are loaded into the memory output register (M register). The contents of the M register are supplied to the N register for decoding therein to thereby indicate that the instruction is a scan instruction. Simultaneously, the M register supplies the contents thereof to the Z driver to index the L register and once again address memory. The contents of the M register, also contain the address of the first channel to be addressed; therefore, the Z drivers supply the C counter with the address of the first input/output channel and bit buffer.

The succeeding location in memory is addressed by the L register and the contents thereof stored in the M register and supplied to the Z drivers for insertion into the A register. The contents of this address represent scan word 1 which is thus temporarily stored in the A register. The L register is indexed and memory is addressed in the next succeeding location and the contents thereof stored in the M register. The M register provides the contents at the particular memory location to the Z drivers for insertion in the B register. As indicated previously, the scan words are stored successively in memory, and the word that is addressed immediately after retrieving the scan word 1 from memory is the scan word 2. Therefore, scan word 1 is stored in the A register and scan word 2 in the B register. Simultaneously with the storing of scan word 2 in the B register, bit position 18 of scan word 2 is tested to see if the transmit flag is on. If the flag is not on, a memory restore cycle is instigated for restoring scan word 2 to memory. Simultaneously with the memory restore cycle, the operation of the system proceeds to point 3 indicated in the diagram of FIG. 24. If the transmit flag is on, the operation of the system proceeds to point 2 of the diagram of FIG. 23.

Figures 22, 23:
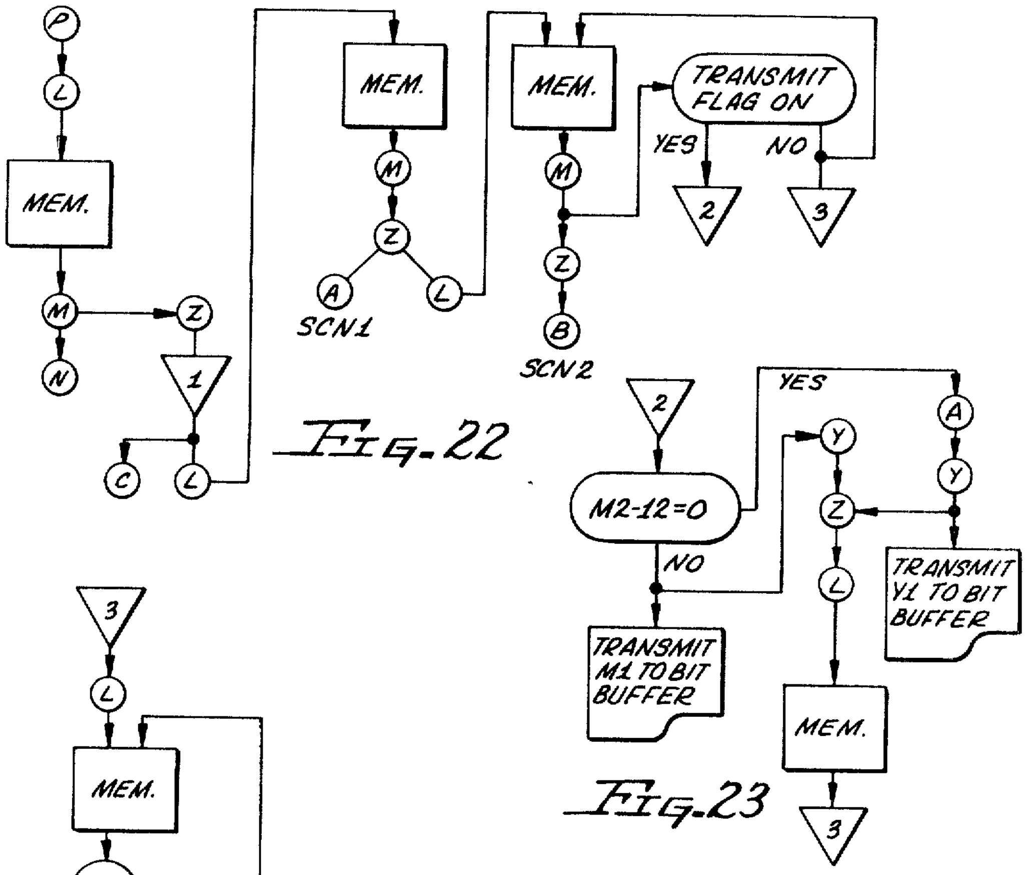

Referring to FIG. 23, the assumption is made that the transmit flag is on as indicated by the presence of a 1 bit in the 18th bit position of scan word 2. Bit positions 2–12 of scan word 2 (presently existing in the M register) are tested to see if all bit positions contain binary zeros. If these bit positions are not all zero, the contents of the first bit position of scan word 2 are transmitted to the bit buffer for transmission over the common carrier. Thus, if any of the bit positions 2–12 include binary 1's, the character in process of being transmitted has not completely been transmitted and the last bit (the bit in position 1) is transmitted. Simultaneously with the transmission of the bit in bit position 1 to the bit buffer, the contents of the M register are provided to the Y register, through the arithmetic unit wherein the bits in positions 2–12 are shifted right one position and supplied to the Z drivers. It may be noted that although the first bit position of scan word 2 is designated as an end of character bit, the contents in position 2–12 are shifted right through the first bit position. Thus, the information contained in the first bit position of scan word 2 will always be considered as a bit of a character being transmitted unless bit positions 2–12 contain binary zeros to thus indicate that the bit in bit position 1 is, in fact, the end of character bit.

If the test of bit positions 2 through 12 yields a result indicating all of these bits are zero, the indication is that scan word 2 has been completely transmitted and preparation must be made to transmit the next character which, as indicated previously, is contained in scan word 1. Thus, the contents of the A register, scan word 1, are placed in the Y register and the first bit of the new character is transmitted to the bit buffer. Simultaneously, scan word 1 is supplied from the Y register through the arithmetic unit, therein to be shifted right one, to the Z drivers. The contents of the A register are thus utilized as scan word 2 and, after being shifted in the arithmetic unit, are supplied to the Z drivers, and then to the L register, for insertion in memory at the memory location of scan word 2. Thus, when the character of scan word 2 has completely been transmitted, scan word 1 becomes scan word 2 and the 18th bit position of the Z drivers is set to indicate the need of a new scan word 1.

Figure 24:
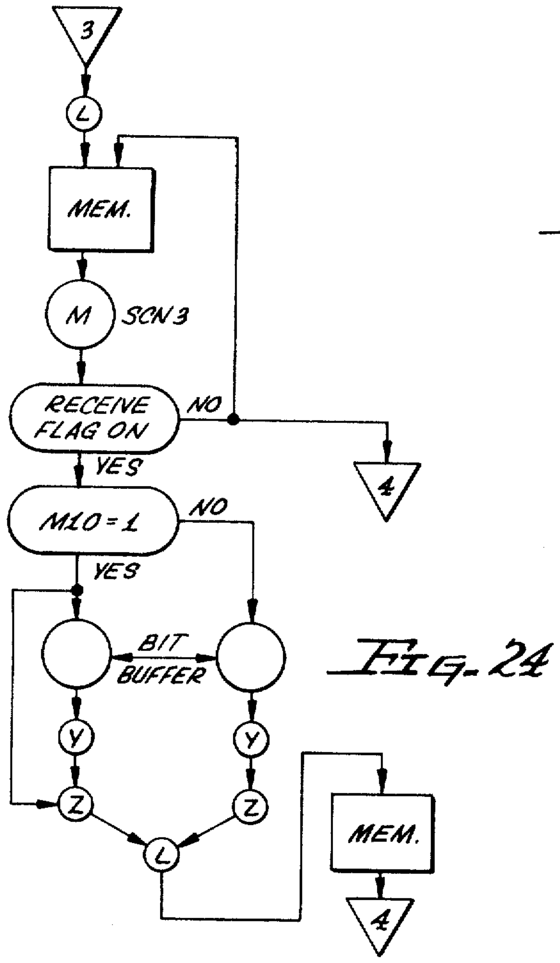
Figure 25:
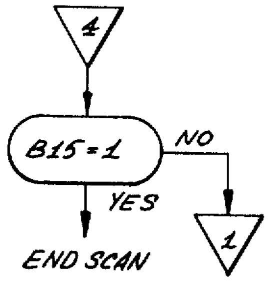

Referring to FIG. 24, the operation of the present system may reach point 3 of FIG. 24 from the corresponding points shown in FIGS. 22 and 23. At point 3, the memory address register is indexed for addressing the next succeeding memory location to thereby retrieve scan word 3 from memory and place it in the memory output register or M register. The 18th bit position of scan word 3 is then tested to see if the receive flag is on. If the receive flag is not on, scan word 3 is restored to memory at the location from which it was taken and the operation proceeds to point 4 shown in FIG. 25. If the receive flag is on, bit position 10 is tested to see if a binary 1 is contained therein. Since each character being received will always begin with a start bit, and since the start bit is placed in position 17 and subsequently shifted to the right as the character is received, when bit position 10 contains a binary 1 it indicates that the next bit to be received from the bit buffer will be the last bit of the character. The start bit is subsequently disregarded since it is not needed in the processor. Thus, if the 10th bit position of scan word 3 contains a binary 1, the 18th bit position of a Z driver is set to indicate a complete character received. Simultaneously, the next bit is received from the bit buffer, placed in the appropriate location in the Y register along with the present scan word 3, and provided to the Z driver through the arithmetic unit. Subsequently, the word is stored in memory through the L register and the operation continues to point 4. If the 10th bit of scan word 3 does not equal 1, the same sequence obtains; however, position 18 of the Z driver is not set since a complete character will not have been received by the addition of the incoming bit. The 15th bit position of scan word 2 in the B register contains a binary 1, the end of scan marker is present and the scan instruction will be complete and will then return to the program for continuation of processing.

Thus, the Q counter, having been loaded with a particular number, will count to zero and instigate a program interrupt, and a hardware scan instruction provided at the program interrupt yields a subroutine for servicing the incoming channels through the expediency of 3 scan words stored in memory for each channel. Further, each bit buffer will present an appropriate flag to be incorporated in the respective scan word and will subsequently be stored in memory. As the scan words are retrieved, the flag of the buffer, provided on the last scan, will be sensed and information will be transmitted from the respective scan words or to the respective scan words (or both) in accordance with the characters being transmitted or received. The memory address register will continue to be indexed to address succeeding memory locations thus retrieving three scan words per channel until all channels have been addressed. At the end of the scan, control will be returned to the program which must then reload the Q counter to prevent the counter from reaching the count of —32. In the event of a failure, and count —32 occurs in the Q counter, the program is automatically reloaded from the paper tape as indicated previously in connection with the Q counter. Thus, the only programming attention necessary to the servicing of the plurality of bit buffers of the present communication processor, is the single instruction of hardware scan which instigates the procedure of addressing successive scan words allocated in memory for the buffer channels. The hardware in the present instance thus provides the necessary control, buffering, timing, coding, and addressing to service all bit buffer units connected to transmission lines providing the data communication processor of the present invention with data transmission facilities.

The present invention has been described in terms of block diagrams and flow charts. It will be obvious to those skilled in the art that the logic, and hardware configuration, indicated by the block diagrams and flow sheets may be implemented by a variety of well known logic circuitry. It is therefore thought unnecessary to describe the present system on a level more detailed than that required for the understanding of those skilled in the data processing arts.

While the principles of the invention have now been made clear in the illustrated embodiments, there will be immediately obvious to those skilled in the art many modifications in structure, arrangement, proportion, elements, materials and components, used in the practice of the invention and otherwise, which are particularly adapted for specific environments and operating requirements, without departing from those principles. The appended claims are therefore meant to cover and embrace any such modifications, within the limits only of the spirit and scope of the invention.

What is claimed is:

1. A data communication processor comprising: memory means for receiving and storing instructions and data; means connected to said memory for supplying a program for storage therein; memory addressing means connected to said memory for addressing and retrieving information, including said program, stored therein; counting means responsive to said stored program for assuming a predetermined count and decrementing said count at a given rate; means responsive to a given count of said counting means lower than said predetermined count for interrupting the operation of said stored program by generating a program interrupt signal; and means responsive to the lowest possible count of said counting means for providing an alarm signal.

2. In a data communication processor responsive to a stored program for receiving, manipulating and transmitting data, a counting means responsive to said stored program for assuming a predetermined count and decrementing said count at a given rate; means responsive to a given count of said counting means lower than said predetermined count for interrupting the operation of said stored program by generating a program interrupt signal; and means responsive to the lowest possible count of said counting means for providing an alarm signal.

3. A data communication processor comprising: memory means for receiving and storing instructions and data; means connected to said memory for supplying a program for storage therein; memory addressing means connected to said memory for addressing and retrieving information, including said program, stored therein; first counting means responsive to said stored program for assuming a predetermined count and incrementing said count at a given rate; means responsive to a given count count of said first counting means lower than said predetermined count for interrupting the operation of said stored program by generating a program interrupt signal; means responsive to the lowest possible count of said first counting means for providing an alarm signal; second counting means connected to increment one count each time said first counting means assumes said predetermined count; means connecting said second counting means to receive said program interrupt signal for resetting said second counting means to zero count; means connected to said second counting means responsive to a designated count thereof for providing an alarm signal indicating said first counting means has assumed said predetermined count a designated number of times without decrementing to said given count to generate a program interrupt signal.

4. In a data communication processor responsive to a stored program for receiving, manipulating, and transmitting data, a first counting means responsive to said stored program for assuming a predetermined count and decrementing said count at a given rate; means responsive to a given count of said first counting means lower than said predetermined count for interrupting the operation of said stored program for generating a program interrupt signal; means responsive to the lowest possible count of said first counting means for providing an alarm signal; second counting means connected to increment one count each time said first counting means assumes said predetermined count; means connecting said second counting means to receive said program interrupt signal for resetting said second counting means to zero count; means connected to said second counting means responsive to a count of N for providing an alarm signal indicating said first counting means has assumed said predetermined count N times without decrementing to said given count to generate a program interrupt signal.

5. A data communication processor connected to a plurality of remote stations for receiving, manipulating, and transmitting data comprising: memory means for receiving and storing instructions and data; means connected to said memory for supplying a program and for storage therein; memory addressing means connected to said memory for addressing and retrieving information, including said program, stored therein; buffer means connected to receive and transmit bit serial information from and to remote stations in the form of pulses transmitted over a common carrier facility; and means responsive to the first pulse received by said buffer for sampling the voltage level of each pulse received at the middle of each of the corresponding pulse periods.

6. A data communication processor connected to a plurality of remote stations for receiving, manipulating, and transmitting data comprising: addressable memory means for receiving and storing instructions and data; means connected to said memory for supplying a program for storage therein; memory addressing means connected to said memory for addressing and retrieving information, including said program stored therein; buffer means connected to receive and transmit bit serial information from and to remote stations in the form of pulses transmitted over common carrier facilities; a baud rate counter for providing receive clock signals at a multiple of the common carrier baud rate; means responsive to the first pulse received by said buffer for counting at said multiple of the baud rate and for generating a sampling signal at a count equal to half said multiple and at every count thereafter equal to said multiple; a first bit storage means connected to receive pulses from remote stations and to receive said sampling signal for storing the binary value of said pulses when said sampling signal is received; means connected to said baud rate counter for generating transmit strobe signals at the common carrier baud rate; a second bit storage means connected to receive information to be transmitted; and means connected to said second bit storage means responsive to said transmit strobe signals for transmitting information stored in said second bit storage means.

7. A data communication processor connected to a plurality of remote stations for receiving, manipulating, and transmitting data comprising: memory means for receiving and storing instructions and data; means connected to said memory for supplying a program for storage therein; memory addressing means connected to said memory for addressing and retrieving information, including said program stored therein; buffer means connected to receive and transmit bit serial information from and to remote stations in the form of pulses transmitted over common carrier facilities; means responsive to the first pulse received by said buffer for sampling the voltage level of each pulse received at the middle of each of the corresponding pulse periods; counting means responsive to said stored program for assuming a predetermined count and decrementing said count at a given rate; means responsive to a given count of said counting means lower than said predetermined count for interrupting the operation of said stored program by generating a program interrupt signal; and means responsive to the lowest possible count of said counting means for providing an alarm signal.

8. A data communication processor connected to a plurality of remote stations for receiving, manipulating, and transmitting data comprising: memory means for receiving and storing instructions and data; means connected to said memory for supplying a program for storage therein; memory addressing means connected to said memory for addressing and retrieving information, including said program stored therein; buffer means connected to receive and transmit bit serial information from and to remote stations in the form of pulses transmitted over common carrier facilities; a baud rate counter for providing receive clock signals at a multiple of the common carrier baud rate; means responsive to the first pulse received by said buffer for counting at said multiple of the baud rate and for generating a sampling signal at a count equal to half said multiple and at every count thereafter equal to said multiple; a first bit storage means connected to receive pulses from remote stations and to receive said sampling signal for storing the binary value of said pulses when said sampling signal is received; means connected to said baud rate counter for generating transmit strobe signals at the common carrier baud rate; a second bit storage means connected to receive information to be transmitted; means connected to said second bit storage means responsive to said transmit strobe signals for transmitting information stored in said second bit storage means; counting means responsive to said stored program for assuming a predetermined count and decrementing said count at a given rate; means responsive to a given count of said counting means lower than said predetermined count for interrupting the operation of said stored program by generating a program interrupt signal; and means responsive to the lowest possible count of said counting means for providing an alarm signal.

9. A data communication processor connected to a plurality of remote stations for receiving, manipulating, and transmitting data comprising: memory means for receiving and storing instructions and data; means connected to said memory for supplying a program for storage therein; memory addressing means connected to said memory for addressing and retrieving information, including said program, stored therein; buffer means connected to receive and transmit bit serial information from and to remote stations in the form of pulses transmitted over common carrier facilities; means responsive to the first pulse received by said buffer for sampling the voltage level of each pulse received at the middle of each of the corresponding pulse periods; first counting means responsive to said stored program for assuming a predetermined count and decrementing said count at a given rate; means responsive to a given count of said first counting means lower than said predetermined count for interrupting the operation of said stored program by generating a program interrupt signal; means responsive to the lowest possible count of said first counting means for providing an alarm signal; second counting means connected to increment one count each time said first counting means assumes said predetermined count; means connecting said second counting means to receive said program interrupt signal for resetting said second counting means to zero count; means connected to said second counting means responsive to a designated count thereof for providing an alarm signal indicating said first counting means has assumed said predetermined count a designated number of times without decrementing to said given count to generate a program interrupt signal.

10. In a data communication processor responsive to a stored program for receiving, manipulating, and transmitting data, a counting means responsive to said stored program for assuming a predetermined count and decrementing said count at a given rate; means responsive to a given count of said counting means lower than said predetermined count for interrupting the operation of said stored program by generating a program interrupt signal; means responsive to the lowest possible count of said counting means for providing an alarm signal; buffer means connected to receive and transmit bit serial information from and to remote stations in the form of pulses transmitted over common carrier facilities; and means responsive to the first pulse received by said buffer for sampling the voltage level of each pulse received at the middle of a corresponding pulse.

11. In a data communication processor connected to a plurality of remote stations for receiving, manipulating, and transmitting data, word storage means including a sequentially addressable portion for storing a plurality of words for each remote station; said plurality of words including a first word indicating the next character to be transmitted, a second word indicating the character being transmitted and the code in which the character is represented, and a third word indicating the character being received and the last character received; means responsive to a given instruction for sequentially addressing said sequentially addressable portion; means responsive to said plurality of words for transmitting portions thereof and adding bits thereto in communication with said remote stations.

12. A data communication processor connected to a plurality of remote stations for receiving, manipulating, and transmitting data comprising: memory means for receiving and storing instructions and data; means connected to said memory for supplying a program for storage therein; memory addressing means connected to said memory for addressing and retrieving information, including said program, stored therein; counting means responsive to said stored program for assuming a predetermined count and decrementing said count at a given rate; means responsive to a given count of said counting means lower than said predetermined count for interrupting the operation of said stored program by generating a program interrupt signal; means responsive to the lowest possible count of said counting means for providing an alarm signal; buffer means connected to receive and transmit bit serial information from and to remote stations in the form of pulses transmitted over common carrier facilities; means responsive to the first pulse received by said buffer for sampling the voltage level of each pulse received at the middle of each of the corresponding pulse periods; said memory means including a sequentially addressable portion for storing *m* words for each remote station; said *m* words including characters being transmitted and received, the next character to be transmitted and the last character received; means responsive to said program interrupt signal and to a given instruction for sequentially addressing said sequentially addressable portion; and means connecting said buffer to said sequentially addressable portion for exchanging bits between said buffer and said *m* words.

13. A data communication processor connected to a plurality of remote stations for receiving, manipulating, and transmitting data comprising: memory means for receiving and storing instructions and data; means connected to said memory for supplying a program for storage therein; memory addressing means connected to said memory for addressing and retrieving information, including said program stored therein; counting means responsive to said stored program for assuming a predetermined count and decrementing said count at a given rate; means responsive to a given count of said counting means lower than said predetermined count for interrupting the operation of said stored program by generating a program interrupt signal; means responsive to the lowest possible count of said counting means for providing an alarm signal; buffer means connected to receive and transmit bit serial information from and to remote stations in the form of pulses transmitted over common carrier facilities; a baud rate counter for providing receive clock signals at a multiple of the common carrier baud rate; means responsive to the first pulse received by said buffer for counting at said multiple of the baud rate and for generating a sampling signal at a count equal to half said multiple and at every count thereafter equal to said multiple; bit storage means connected to receive pulses from said remote stations and to receive said sampling signal for storing the binary value of said pulses when said sampling signal is received; means connected to said baud rate counter for generating transmit strobe signals at the common carrier baud rate; second bit storage means connected to receive information to be transmitted; means connected to said second bit storage means responsive to said transmit strobe signals for transmitting information stored in said bit storage means; said memory means including a sequentially addresable portion for storing *m* words for each remote station; said *m* words including the characters being transmitted and received, the next character to be transmitted, and the last character received; means responsive to said program interrupt signal and to a given instruction for sequentially addresing said sequentially addressable portion; means responsive to one of said *m* words for designating the code used by the corresponding remote stations; and means connecting said buffer to said sequentially addressable portions for exchanging bits between said buffer and said *m* word.

14. A data communication processor connected to a plurality of remote stations for receiving, manipulating, and transmitting data comprising: addressable memory means for receiving and storing instructions and data; means connected to said memory for supplying a program for storage therein; memory addressing means connected to said memory for addressing and retrieving information, including said program, stored therein; counting means responsive to said stored program for assuming a predetermined count and decrementing said count at a given rate; means responsive to a given count of said counting means lower than said predetermined count for interrupting the operation of said stored program by generating a program interrupt signal; means responsive to the lowest possible count of said counting means for providing an alarm signal; buffer means connected to receive and transmit bit serial information from and to remote stations in the form of pulses transmitted over common carrier facilities; a baud rate counter for providing receive clock signals at a multiple of the common carrier baud rate; means responsive to the first pulse received by said buffer for counting at said multiple of the baud rate and for generating a sampling signal at a count equal to half said multiple and at every count thereafter equal to said multiple; bit storage means connected to receive pulses from remote stations and to receive said sampling signal for storing the binary value of said pulses when said sampling signal is received; means connected to said baud rate counter for generating transmit strobe signals at the common carrier baud rate; second bit storage means connected to receive information to be transmitted; means connected to said second bit storage means responsive to said transmit strobe signals for transmitting information stored in said bit storage means; said memory means including a sequentially addressable portion for storing a plurality of words for each remote station; said plurality of words including a first word indicating the next character to be transmitted, a second word indicating the character being transmitted and the code in which the character is represented, a third word indicating the character being received and the last character received; and means connecting said buffer to said sequentially addressable portion for exchanging bits between said buffer and said plurality of words.

References Cited by the Examiner

UNITED STATES PATENTS 3,061,192 10/1962 Terzian ------------ 340—172.5

ROBERT C. BAILEY, *Primary Examiner.*

G. D. SHAW, *Assistant Examiner.*